Figure 1:
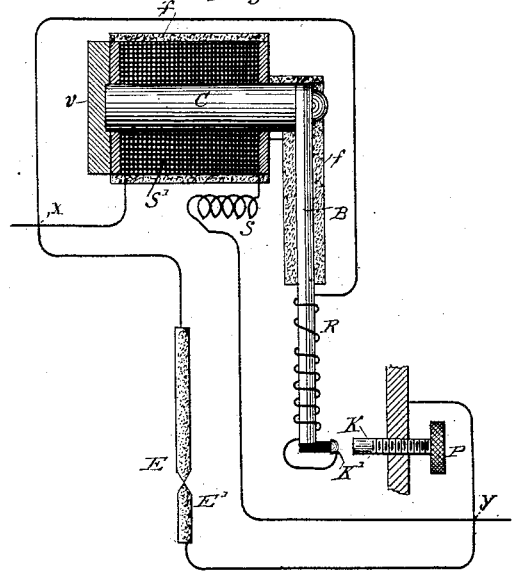

(No Model.)

E. THOMSON & E. W. RICE, Jr.
AUTOMATIC CUT-OUT FOR ELECTRIC LAMPS.

No. 338,208. Patented Mar. 16, 1886.

Witnesses:
Ernest Abshagen
Thos. Dooney

Inventors:
Elihu Thomson
E. W. Rice, Jr.
By their Attorney: H. C. Townsend

UNITED STATES PATENT OFFICE.

ELIHU THOMSON AND EDWIN WILBUR RICE, JR., OF LYNN, MASS., ASSIGNORS TO THE THOMSON-HOUSTON ELECTRIC COMPANY, OF CONNECTICUT.

AUTOMATIC CUT-OUT FOR ELECTRIC LAMPS.

SPECIFICATION forming part of Letters Patent No. 333,208, dated March 16, 1886.

Application filed May 21, 1884. Serial No. 132,293. (No model.)

*To all whom it may concern:*

Be it known that we, ELIHU THOMSON and EDWIN WILBUR RICE, Jr., citizens of the United States, and residents of Lynn, in the county of Essex and State of Massachusetts, have invented certain new and useful Improvements in Automatic Cut-Outs for Electric Lamps and other Electric Apparatus, of which the following is a specification.

Our invention relates to apparatus designed to prevent the interruption of an electric light or other electric circuit by the formation of excessive resistance, due, in the case of an electric light, to excessive length of arc in the lamp operated on said circuit, or to other conditions, either in the case of an electric lamp or other electrically-operated apparatus, such that an interruption of the general circuit would be produced.

The principal object of the invention is to so construct or combine the apparatus that momentary variations of resistance shall be incapable of operating the cut-out device, and that the abnormal resistance shall require to be maintained for a short time.

A further object of the invention is to secure ease of adjustment and constancy of action.

Our invention consists, first, in an automatic cut-off for electric lamps or other apparatus, consisting of a thermo-motive device actuated by the heat obtained from a derived circuit around the lamp, or such portion thereof as is liable to interrupt the general circuit, the motion of said thermo-motive device serving to throw into action or to operate suitable switching apparatus, whereby a branch or safety circuit may be formed for the current.

Our invention consists, secondly, in an automatic cut-out device for an electric lamp or other apparatus, composed of a compound metallic bar heated by the passage of current in a derived circuit of high resistance, in combination with suitable switching mechanism for forming a safety or branch circuit whenever the heating effects reach a predetermined degree.

Our invention consists, thirdly, in the combination, with the thermo-motive device, of an accessory or supplemental circuit closed by the action of the same and serving as a path for electric current, whereby the safety or shunt circuit closed by the agency of the thermo-motive device may be maintained.

Our invention consists, fourthly, in the combination, with the thermo-motive device, consisting, preferably, of a compound metallic bar, of an accessory or supplemental circuit closed by the agency of said bar when the shunt or safety circuit is closed, and including a coil of wire arranged in suitable relation to the compound bar, so that the heating effects developed by the current flowing in said supplemental circuit shall keep the compound bar in position to maintain a closure of the safety or shunt circuit.

Our invention consists, further, in a compensating device, whereby the adjustment of the thermo-motive devices may be maintained despite changes in external temperature, the essential characteristic of this portion of the invention consisting in mounting each member of the circuit-closer upon a compound metallic bar or other thermo-motive device so arranged that the movement of the bars shall carry the two portions of the circuit-closer in the same direction.

Our invention consists, also, in certain details of construction and combinations of parts, which will be hereinafter more fully described, and then specified in the claims.

Figure 2:
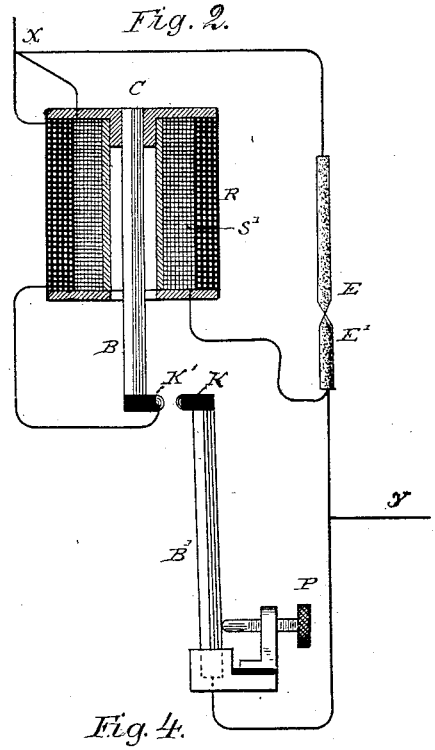
Figure 3:
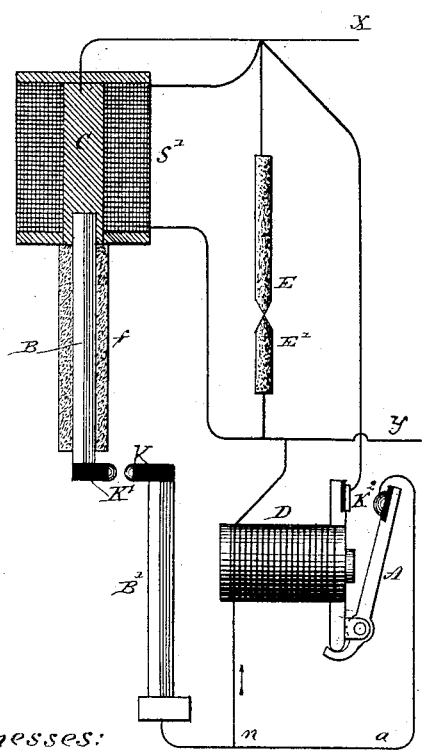
Figure 4:
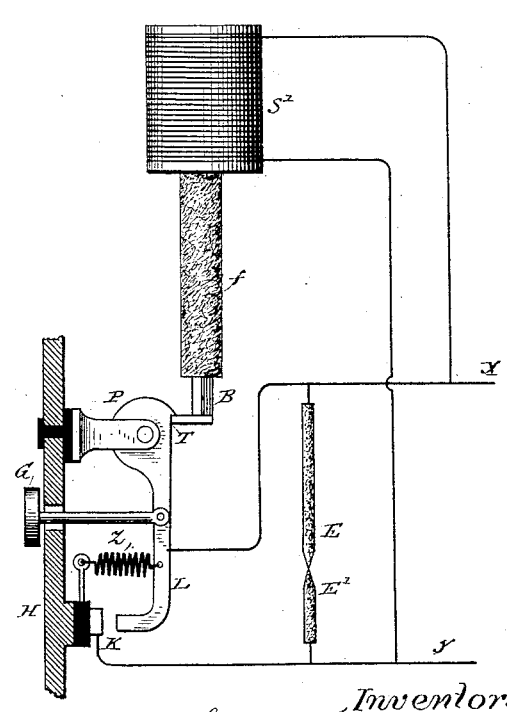

In the accompanying drawings, Figure 1 is an elevation and partial vertical section of a cut-out apparatus constructed according to our invention, and shows the same as applied to an electric-arc lamp. Fig. 2 illustrates a modification of the invention and one method of constructing or arranging the compensating device for changes of external temperature. Fig. 3 illustrates a modification in which the supplemental or accessory circuit contains an electro-magnet for keeping the safety or shunt circuit closed. Fig. 4 shows in elevation another modification of our invention.

Referring to Fig. 1, S' indicates a coil of comparatively high resistance in a derived circuit around the carbons E E' of an electric-arc lamp, while C is a core, of copper or other good conductor of heat, upon which the coil is wound.

B indicates a compound bar fastened to the end of the core C by screws or otherwise, so that the heat developed in the coils S' by the passage of electric current may be communicated through the core to the bar.

The bar B is constructed after the manner employed with metallic thermostats, and is composed, as well understood, of two metals unequally expansible by heat, so that the heating of the bar will cause a flexure of the same and a movement of its free end. After experiments with various materials we find it preferable to construct the compound bar of thin strips of aluminium and iron. Such materials possess the merit of being cheap, easily obtained and worked, while, moreover, a bar constructed of them affords considerable range of movement for a small variation of heat.

R indicates a coarse-wire resistance formed of an insulated conductor, which is wrapped around the bar B for the greater part of its length, but is out of electrical connection therewith. The conductor R terminates in a contact, K', which may be either a piece of metal to which the conductor is secured, or may consist of the end of the conductor itself. The piece K' forms one of two contacts, the other, K, of which is carried by an adjusting-screw, P, whose function is to vary the amount of separation of the contacts. The compound bar B is so constructed that when heated its free end moves toward the screw P, decreasing the separation of the contacts K K'. If the bar B becomes sufficiently heated, it will move far enough to close the contacts K K'. The coil R and the contacts K K' are connected, as shown, to the conductor leading to the carbons at a point, $x$, while the frame carrying the screw P is connected to the conductor on the other side of the arc at a point, as $y$, so that when the contacts K are brought together a shunt or safety circuit around the carbons and any devices in the branch with them will be formed.

To prevent the escape of heat from the core C and facilitate the conduction of heat to the bar B, the outside of the coil S' is covered with a non-conductor of heat, such as cloth or felt. (Indicated at $f$.) The end of the core C and the upper extremity of the bar B are also covered with felt or other non-conducting substance. The coil R may also be sheathed with felt for the same purpose.

The course of the current is as follows: Entering at $x$, the current has open to it three paths, the first through the carbon electrodes E E', or other resistance, out to $y$; the second, through the derived circuit of high resistance around E E', and including the resistance-coil S'; the third, through the resistance-wire R, contacts K K', when closed, through P, and thence through $y$; the last path is normally open at the contacts K K', and is only complete under abnormal conditions, or those requiring the formation of a safety or shunt circuit to prevent rupture of the general circuit.

The operation is as follows: So long as the arc or resistance at E E' remains normal the heat developed in the resistance S' is only sufficient to raise the temperature of the core C and bar B slightly above the normal amount. When, however, the arc or resistance becomes excessive from any cause whatever, more current is forced into the coil S', generating in turn more heat, which is transmitted to the bar B. Under the influence of the increased heat the bar B is flexed or bent and gradually decreases the separation of the contacts K K', eventually closing the same, and thus allowing the current to take a short path around the resistance E E' through the resistance-wire R. The heat developed in the wire R acts upon the bar sufficiently to keep the same flexed, and to therefore maintain the closure of circuit at the contacts K K' so long as the current circulates. Were it not for the resistance-wire R, it is evident that as soon as the carbons E E' were cut out the cessation of current in S' would permit the bar to cool and the contacts K K' would be open, thus causing a destructive arc. The amount of increase in resistance in the branch circuit containing E E' required to operate the device may be regulated by varying the space between the contacts K K'.

In the modification of our device shown in Fig. 2 the parts are somewhat more compactly arranged, and a compensation for variation of external temperature is introduced, whereby the adjusted distance between the contacts K K' may be kept the same during such variation. The core C of the coil is in this case a copper tube, and surrounds the bar B through most of its length. The fine wire S' surrounds the core C, as in Fig. 1, but the coarse wire R, instead of being applied to the bar directly, is in this instance wound over the coil S'. It is obvious that, other conditions remaining the same, the distance between the contacts K K' will vary according to the external temperature; hence when the external temperature is very high the device would operate to form a shunt or safety circuit much sooner than if it were low.

In order to secure perfect uniformity of action under all conditions, we mount the contact K presented to contact K', upon another compound bar or similar thermo-motive device. (Indicated at B'.) Both bars B B' are so arranged as to be affected equally by a given change of temperature, and to move the two contacts K K' equally in the same direction, thus maintaining the adjusted separation, which will therefore remain the same until the bar B becomes additionally heated by current in the coil S'. The operation of this device is in substance the same as that of Fig. 1.

In Figs. 1 and 2 the accessory or supplemental circuit or branch by which the closure of contact is maintained after being once formed is that portion of the safety branch containing the coil R, and the heating effects of the current in such supplemental branch or circuit are utilized for the stated purpose. In Fig. 3 we have shown an arrangement in which an electro-magnet and its coils are substituted for the coil R of Fig. 1, and the armature-lever of said magnet is made to operate supplemental or extra contacts, which themselves also close a safety or branch circuit and maintain it closed, because the coils of the magnet are included in circuit with them. D indicates the coils of such magnet, which, as shown, are included in a circuit from $x$ to $y$ through the contacts K K' when the latter are closed. A indicates the armature-lever for said magnet, and $K^2$ insulated contacts, one carried by the armature A, and serving, when the armature is drawn up by the magnet, to close the circuit from $x$ to $y$ through the armature A, a wire, $a$, connected with said armature and the coils D, the wire $a$ being connected to the branch closed by the action of contacts K K' at a point, $n$.

The action is as follows: An increased resistance at E E' increases the flow of currents in S' and heats the bar B sufficiently to cause the closing of contacts K K', as before explained. The current then passes from $x$ to core C, down the bar B, through contacts K K', bar B', to point, $n$, and from thence through the coils of magnet D to $y$. The magnet D thereupon immediately attracts its armature A, closing contacts $K^2$, and forming a circuit through insulated contact on A and wire $a$ to $n$, thence through D and out at $y$. The magnet D therefore remains energized, so as to hold its armature up and keep the contacts $K^2$ closed, short-circuiting or cutting out the resistance at E E'.

In the modified form of our device shown in Fig. 4 the motion of the bar B releases a lever, L, by disengaging a catch at T, thus permitting the spring Z to pull the lever L and close the contacts K K'. The current then passes from $x$ to L, across contacts K K', and to $y$. The lever L may be set in position again, so as to be held by the catch T, by pushing on the button G, formed on the end of a bar or pin operatively connected with the lever L.

We do not limit ourselves as to the form or construction of the thermo-motive device whereby the action of the devices is controlled or produced. We find that the compound bar is the best adapted to the purposes of our invention; but other thermostatic or thermo-motive apparatus may be substituted for it if arranged in the electrical relation to the electric arc of an electric-arc lamp herein described.

It is obvious that our invention is not limited to electric-arc lamps, but may be applied to any electrically operated or controlled device in which it may be desirable to provide for an accidental high resistance or rupture of circuit.

We make no specific claim herein to the feature of improvement that consists in the use of the magnet thrown into circuit by the thermo-motive device for keeping the branch closed; nor do we make specific claim herein to the special mechanism of Fig. 4, excepting in so far as the same may embody the invention claimed, broadly considered. These features will be made the subject of a separate application for patent, in which they will be specifically claimed.

What we claim as our invention is—

1. In an automatic cut-out for electric lamps or other electrically operated or controlled mechanism, the combination of a derived circuit of high resistance around the lamp or portion of the lamp in which abnormal resistance may occur, and a thermo-motive device actuated by the heat in said derived circuit for closing a safety or branch circuit.

2. The combination, in an automatic cut-out for an electric lamp or other electrically-operated apparatus, of a derived circuit of high resistance, a thermo-motive device actuated by the heat developed in said derived circuit for closing a safety or branch circuit, and a supplemental or accessory circuit or portion of a circuit closed by the action of the thermo-motive device for conveying a current whose thermal or equivalent action, as specified, may serve to keep the safety or branch circuit closed.

3. The combination, with an electric lamp or other electrically-operated apparatus, of a derived circuit containing a coil of high resistance, a compound metallic bar exposed to the action of the heat developed by the current in said coil, and a branch or safety circuit closer actuated by said bar.

4. The combination, with the derived circuit containing the resistance-coil, of a compound bar, a safety or branch circuit, and a coil in said circuit arranged in suitable relation to the bar, so that the heat developed by the current in said latter coil shall keep the bar flexed and in position to maintain the safety or branch circuit closed.

5. The combination, with the derived circuit and the thermo-motive device actuated by heat developed therein, of a safety or branch circuit closer, one member of which is controlled by said thermo-motive device, while the other member is controlled by a second thermo-motive device, whereby disturbance in the adjustment of the circuit-closer by changes of external temperature may be avoided.

6. The combination, with the resistance-coil S', of a core, C, a compound bar, B, a second compound bar, B', and contacts K K', one of the latter being supported on each bar.

7. The combination of a derived-circuit coil of high resistance, a compound bar actuated by the heat developed in said coil, a circuit-closer governed in its action by the bar, and a heating-coil wound over the bar and in the circuit closed by the action of the same.

8. The combination, with the coil S', of a core, C, a compound bar, B, covered with felt or similar non-conductor of heat, and a shunt or safety circuit-closer governed in its action by said bar.

9. In an automatic safety circuit-closer, a compound bar composed of aluminium and iron, and a circuit-closer governed in its action by said bar under the influence of the heating effects of the electric current.

Signed at Lynn, in the county of Essex and State of Massachusetts, this 15th day of May, A. D. 1884.

ELIHU THOMSON.
EDWIN WILBUR RICE, JR.

Witnesses:
E. B. DOAN,
E. J. RICHARDS.